Patented Aug. 23, 1938

2,127,626

UNITED STATES PATENT OFFICE 2,127,626

PURIFYING LIME

Louis Block, Joliet, Ill., assignor to Blockson Chemical Co., Joliet, Ill., a corporation of Illinois No Drawing. Application June 24, 1936, Serial No. 87,041

3 Claims. (Cl. 23—186)

The present invention relates to the manufacture of lime from limestone, and has particular reference to the manufacture of lime with a low content of fluorine. It also relates to the treatment of lime to lower the fluorine content.

In the ordinary processes of calcining limestone to form lime, retorts or furnaces are used which subject the stone to elevated temperatures at which the calcium carbonate of the stone breaks up into carbon dioxide and the oxide of calcium (CaO) or lime. The carbon dioxide escapes as a gas leaving the residual lime in lump form corresponding to the lumps of stone employed, or smaller, if there is mechanical breakage in the process. The dissociation of the calcium carbonate of the stone into lime and carbon dioxide begins at about 900° C. However, the industrial processes usually employ higher temperatures such as 1000° C. or higher. They have avoided excessively high temperatures and long periods of time because of extra cost, and because of danger of "dead-burning" of the lime.

These general processes result in a product which contains an appreciable content of fluorine (usually as fluoride), resulting from fluorine-containing mineral which is universally present in limestone used as raw material. There may be from 20 to 300 or more parts per million of fluorine in commercial limestones. As much as 47 parts per million of fluorine in lime is considered a high fluorine content for uses of lime wherein the lime enters products for human consumption, or enters processes resulting in products for human consumption. Difficulty has been experienced in arriving at processes for economically removing fluorine to provide a lime with a safe lowered fluorine content. It has heretofore been proposed to heat the finished lime in the process of calcining stone for a longer period at a higher temperature than is necessary for lime formation. It has been shown that in such a process the fluorine is not removed until the carbon dioxide is substantially completely removed, and that no substantial removal of fluorine occurs until the material has been heated for an hour at 1400° C., and until after the carbon dioxide content has been reduced to below 0.26%. After this point the evolution of fluorine is sufficiently rapid to permit use of such a process.

The object of the present invention is to produce lime or to treat lime so as to lower its fluorine content by avoiding higher temperatures than are commonly used to produce lime, by avoiding long period of high heat, and hence at lower cost.

In order to illustrate the nature of the present invention, it is desirable to specify an exemplary grade of limestone and to show how it is affected by various procedures corresponding generally to prior art lime manufacture or to processes calculated to lower the fluorine content. Accordingly, there is set forth herewith a particular high-purity limestone of analysis with regard to the mentioned components, as follows:

| Item | Limestone | Calculated to lime basis |
|---|---|---|
| Calcium oxide (CaO) | 55.7% | |
| Acid insoluble | 0.27% | 0.49% |
| Iron oxide ($Fe_2O_3$) | 0.037% | 0.066% |
| Aluminum oxide ($Al_2O_3$) | 0.063% | 0.11% |
| Fluorine | 47 ppm. | 85 ppm. |

Ppm. means parts per million.

Stone of such quality in fine mesh such as 10 to 20 is heated to 900° C. to 950° C. for one hour to accomplish the initial calcination to lime, representing the prior art process of lime manufacture which results in retention of a high fluorine content. Additional heating under 1000° C. fails to remove fluorine to any degree permitting practical use. Heating at higher temperatures reduces the fluorine content as illustrated by the following table:

2 hours at 1100° C. reduces fluorine to 43 ppm.
4 hours at 1100° C. reduces fluorine to 42 ppm.
1 hour at 1350° C. reduces fluorine to 31 ppm.
4 hours at 1350° C. reduces fluorine to 21 ppm.

The present invention is based upon the discovery that the addition of water vapor aids in the removal of fluorine, and permits the removal process to be carried out in a shorter time and at a heat lower than is required when water-vapor is absent. It is therefore the object of the invention to introduce water vapor into heated lime to remove fluorine.

In the use of water vapor to remove fluorine there is of course a sweeping of gas through the lime, which gas is a vehicle for carrying away any fluorine in a vapor or gaseous form or compound. So to show that the effectiveness of water vapor is not due to such a mechanical vehicular action, dry air has been used as a vehicle, then ordinary air, and then ordinary air enriched with water vapor.

Case A.—Dried air

Air was dried by passing it through concentrated sulphuric acid. The dry air was passed through the heated lime at the rate of 24 to 27 liters (cold measure) per hour per kilogram of initial limestone. The change in fluorine content in 4 hours was nil.

Case B.—Normal air

The conditions of Case A were observed using, instead of dry air, ordinary air at 25° C., 60% saturated with moisture. From known tables and by simple calculation the moisture used is found to be 3.31 to 3.73 grams of water as vapor per hour per kilogram of initial limestone. The result was an appreciable lowering of fluorine content in 4 hours, but not enough to render the lime satisfactory. The measured results are shown in the table below. The result does show that the water vapor has had an appreciable effect.

Based upon the discovery thus made that water vapor in such small quantity as normally found in air, has an appreciable effect, the addition of water vapor specially, was tested.

*Case C.—Normal air and water vapor*

Using the same conditions as for Case B, water was added to the normal air (60% saturated at 25° C.). Water was added at the rate of 300 grams per hour per kilogram of original limestone. Added to the natural vapor content (Case B), this makes a total of water vapor usage of about 303.5 grams of water per hour per kilogram of original limestone. The results showed in 1 hour a fluorine content less than that obtained in four hours in Case B, and in two hours, a very low fluorine content was observed. The results are shown in the table below.

*Case D.—Carbon dioxide and water vapor*

Heretofore it has been stated that the fluorine is not released by long heating at very high temperature until the carbon dioxide is substantially all released. This might naturally be construed as an indication that carbon dioxide prevents the release of fluorine. Likewise, the results of Cases A, B, and C might lead to the conclusion that air and water vapor work in combination. To test such conlusions, carbon dioxide has been used to the exclusion of all air and the results are of the same order as in Case C. 300 grams of water vapor per hour was used in a vehicle of carbon dioxide for every kilogram of original limestone, corresponding to the amount in Case C. Results are shown in the table below.

| (At 1100° C.) | Residual parts per million of fluorine following treatment after calcination | | | | |
|---|---|---|---|---|---|
| | Zero | ½ hour | 1 hour | 2 hours | 4 hours |
| Case A: (Dried air) | 53 | | | 51 | 55 |
| Case B: (Ordinary air) | 53 | | 35 | 21 | 15 |
| Case C: (Ordinary air plus water vapor) | 53 | 36 | 11 | 3 | |
| Case D: (Carbon dioxide plus water vapor) | 53 | 15 | 9 | 6 | |

From the above results it may be seen that the use of water vapor in large excess over that present in ordinary air is instrumental in accelerating the removal of fluorine from heated lime at a temperature normally encountered in commercial calcining processes. This may be readily accomplished by using steam and air. Other experiments have been carried on showing that where the water vapor added to air is increased from the 300 parts of Case C to about 1000 parts, the fluorine content can be more quickly lowered, as to 3 parts per million in one-half hour. Use of less added water makes the process slower. For example, where the added water is only 80 parts, compared to 300 in Case C, the process in two hours gives a product containing 10 parts per million compared to 3 parts per million (Case C).

Accordingly, the invention may be carried out by adding water as such or as vapor to air, to carbon dioxide, or to mixtures of these, using the gases only as a vehicle for diluting the water. Flue gas and water vapor have also been used with like effect. Since flue gas contains nitrogen and carbon dioxide, it follows that nitrogen is also an inert gas for admixture with others. Therefore, it is established that water vapor and inert gas are suitable as a vehicle for the process. The common and cheap gases: nitrogen, oxygen and carbon dioxide, or mixtures of these are suitable inert gases for this process. It is of course to be understood that the carbon dioxide is inert to lime only at temperatures above the dissociation temperature of limestone. The injection of steam and of a current of air, carbon dioxide, or flue gas into lime heated at 1100° C. or higher is a simple, cheap and practical way of lowering the fluorine content. The treatment may be practiced on commercial lime specially heated in special equipment for the purification described, or it may follow the ordinary calcination by which lime is produced from limestone, using the calcination equipment. The treatment may be continued until the fluorine content of the lime is reduced to a desired limit of fluorine, which limit will of course be determined by the prospective use of the lime. For general purposes 5 parts per million of fluorine in lime may be considered as substantially fluorine-free lime.

For practical purposes the particle size of the lime is immaterial to the success of the process, the solid limestone at the lower temperatures of calcining yielding a porous lime lump. The higher temperatures heretofore employed in calcination or in fluorine reduction tend to fuse silicate or other impurities in the lime, closing its porosity. The lower temperature at which the present process may be practiced assures retention of porosity.

Various adaptations of the process are permissible and contemplated under the appended claims.

I claim:

1. The method of treating lime containing combined fluorine to lower the fluorine content thereof, which comprises treating the lime at a temperature of about 1100° C. with a stream of inert gas enriched with added water vapor in such quantity that substantially all the fluorine is removed in less than approximately four (4) hours.

2. The method of treating lime containing combined fluorine to lower the fluorine content thereof, which comprises treating the lime at a temperature of about 1100° C. with a stream of inert gas enriched with steam in such quantity that substantially all the fluorine is removed in less than approximately four (4) hours.

3. The method of producing fluorine-free lime from limestone comprising calcining the limestone to produce lime containing combined fluorine, treating the lime at a temperature of about 1100° C. until fluorine free, with a stream of inert gas enriched with water vapor in a quantity varying between 80 to 1000 parts of water vapor per hour to each 1000 parts of original limestone.

LOUIS BLOCK.